United States Patent [19]

Tripp et al.

[11] Patent Number: 4,957,541

[45] Date of Patent: Sep. 18, 1990

[54] CAPACITOR GRADE TANTALUM POWDER

[75] Inventors: Terrance B. Tripp, Westboro; Richard W. Hildreth, Holliston, both of Mass.

[73] Assignee: NRC, Inc., Newton, Mass.

[21] Appl. No.: 265,498

[22] Filed: Nov. 1, 1988

[51] Int. Cl.$^5$ .............................................. B22F 9/24
[52] U.S. Cl. ...................................... 75/245; 361/529; 420/427
[58] Field of Search .............. 75/0.5 BB, 251, 0.5 BC; 361/529

[56] References Cited

U.S. PATENT DOCUMENTS

| | | | |
|---|---|---|---|
| 3,825,802 | 7/1974 | Kumagai et al. | 361/529 |
| 4,009,007 | 2/1977 | Fry | 75/0.5 BB |
| 4,041,359 | 8/1977 | Mizushima et al. | 361/529 |
| 4,379,128 | 4/1983 | Haehn et al. | 75/0.5 BB |
| 4,483,819 | 11/1984 | Albrecht et al. | 75/0.5 BB |
| 4,537,641 | 8/1985 | Albrecht et al. | 75/0.5 BB |
| 4,645,533 | 2/1987 | Izumi | 75/0.5 BB |

*Primary Examiner*—Upendra Roy
*Attorney, Agent, or Firm*—Jerry Cohen

[57] ABSTRACT

Tantalum powders of capacitor grade are provided, containing interacting silicon and phosphorous dopants to effect low D.C. leakage of electrolytic capacitors having anodes made from such powders, with anodic formation at low temperatures (40°–60° C.), consistent with high capacitance.

7 Claims, 2 Drawing Sheets

CAPACITOR GRADE TANTALUM POWDER

BACKGROUND OF THE INVENTION

The present invention relates to capacitors and tantalum powders of capacitor grade, used in production of miniature, high-specific-capacitance, low-leakage, solid state electrolytic and wet electrolytic capacitors with anode pellets or slabs made of sintered valve metal powders, e.g., tantalum,.

It is known in the art that phosphorous doping retards sinter closure of tantalum powders used in anode production to preserve a high capacitance of the tantalum powder. However, increasing levels of phosphorous doping also produce unacceptable increases in D.C. leakage, particularly in anodes formed (oxidized) at lower temperatures, e.g. 60° c.

It is a principal object of the present invention to provide an improved capacitor grade tantalum powder affording practical high capacitance at low leadage and to produce anodes therefrom, formable at over 40° C. and throughout the range 40°–90° C.

That is, the anode is to be formable at any temperature in such range consistent with high capacitance and low leakage (whereas prior art items have unacceptably high leakage at the lower portion of such range). The terms "form", "forming" "formable" and the like refer to the well known wet process of anodic oxidation to establish a tantalum oxide surface film as a capacitor dielectric element at the surface of the tantalum powder particles.

SUMMARY OF THE INVENTION

The object of the invention is achieved in a multi-dopant tantalum powder comprising uniquely balanced silicon and phosphorous dopants or equivalents in an otherwise high purity (capacitor grade), high surface area (in excess of 4,000 sq. cm./gm.), tantalum powder. The phosphorous enhances capacitance and the silicon suppresses leakage normally associated with high phosphorous doping levels and also enhances capacitance. The silicon can be added at various stages of tantalum production but is preferrably added during reduction of a tantalum precursor (e.g., the standard method of $K_2TaF_7$ reduction by Na reducing agent). Phosphorous content is more flexibly established at various stages, but preferrably after reduction.

The preferred ranges are 50–1,000 ppm of silicon in relation to tantalum, and 10–300 ppm phosphorous, but more preferably 100–500 ppm Si and 20–80 ppm P.

The resultant tantalum can be agglomerated, deoxidized, sintered at or over 1,400° C. and anodized at or over 40° c. to form a high specific capacitance, low leakage anode of an electrolyte capacitor (wet or solid electrolytic).

Other objects, features, and advantages will be apparent from the following detailed description of preferred embodiments thereof illustrative of practice thereof and of various aspects of discovery leading to the invention, including certain graphs of performance data shown in the accompanying drawing in which:

DETAILED DESCRIPTION OF PREFERRED EMBODIMENTS

Figure 1:
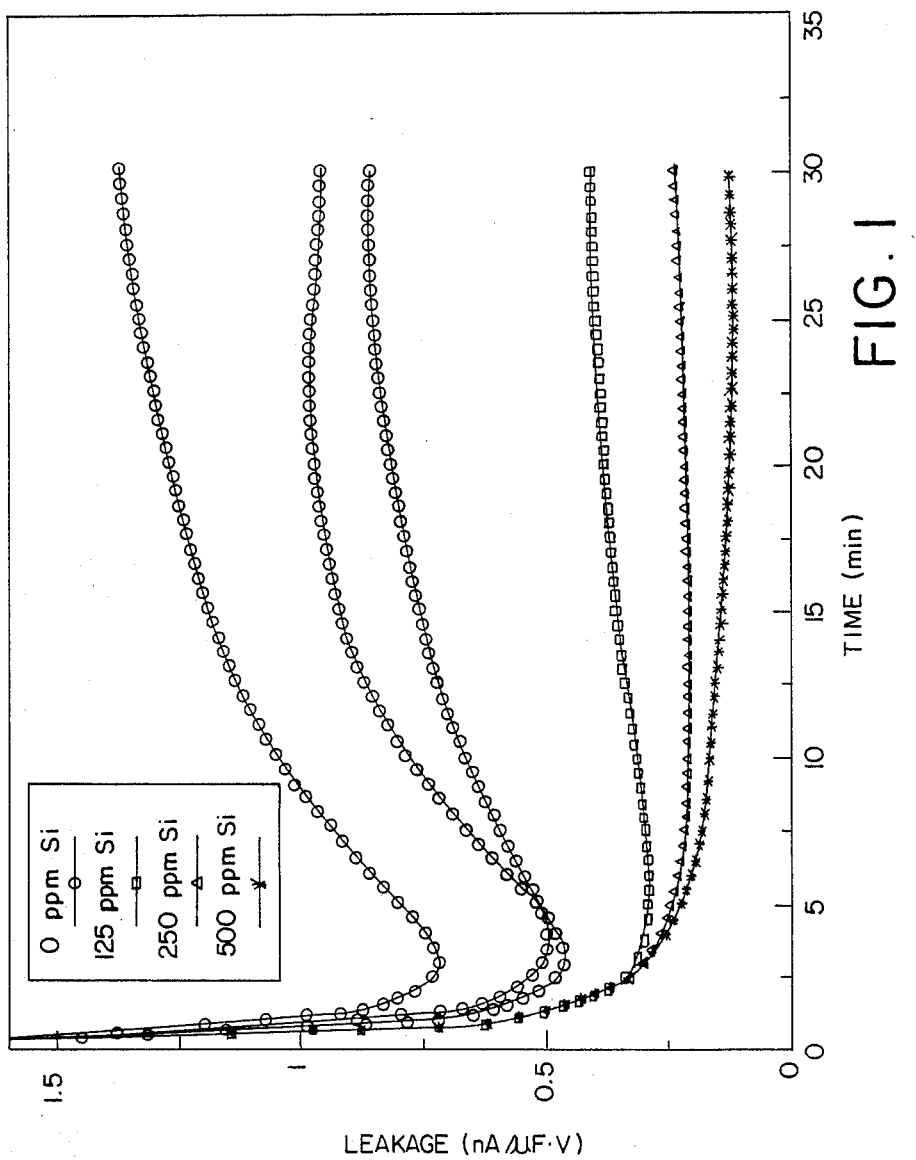
FIGS. 1 and 2 are curves of leakage vs. time results for powders made in accordance with preferred embodiments of the invention.

A stirring reduction reactor can be charged with $K_2TaF_7$ or $Na_2TaF_7$ double salt (tantalum precursor), preferably diluted in NaCl or other practical halide salts of sodium or potassium, which is melted and stirred and subject to reduction by molten sodium added to the charge after melting (or pre-mixed therewith). The dilution can vary from 0:1 to 1:1 weight ratio of diluent to precursor. Silicon and dopants are preferrably added to the charge prior to or during moltent state reduction. The silicon dopant is preferrably provided in the form of compounds thereof, such as $Si_3N_4$ and $K_2SiF_6$. The phosphorous can be a component of the $K_2TaF_7$ or $Na_2TaF_7$ charge or diluent, or added to tantalum after the reduction, as viable alternates or supplements to addition during reduction. Preferably the phosphorous is added after the reduction stage.

The reduction processing, per se, can be in accordance with any of the well established industry procedures for effecting the same in batch reactors, or in continuous processing extensions of such procedures. All such procedures involve production of an end product mass containing elemental tantalum and salt by-products. The tantalum may be isolated from the by-products by chemical (acid leaching) methodology and/or other separation techniques to produce primary powder particles. Product crushing, sieving and other physical handling means incidental to such separation and subsequent size sorting of the primary powders are well known per se.

Preferably, the primary powders are agglomerated by presintering to produce sponge-like secondary powders, and deoxidized, both procedures being also well known in the art.

The following non-limiting examples are presented.

EXAMPLE I

Tantalum primary/secondary powders were produced as described above with these specifics of silicon and phosphorous content:

(1) Several samples had 20 ppm P and others had 40 ppm P, these levels being established in both instances, primarily after reduction and leaching and before agglomeration (to secondary powder form) and deoxidation. The presintering conditions were as set forth in Table I below. Silicon introduction was made by addition of $Si_3N_4$ to the reduction charge in amounts shown in Table I (either 500 or zero) where 500 ppm is added and the resultant tantalum powder has over 250 ppm of retained silicon after processing losses.

(2) Sintered pellets (1 gram, pressed to green density of 4.5 gm/cc and sintered for thirty minutes at sinter temperatures of Table 1) were produced from the secondary powders and anodized at 60° C. in 0.01 (vol. %) phosphoric acid under an electrical schedule of 60 ma/gm to 70 V with a four hour hold at 70 V.

(3) The anodized pellets were tested for capacitance, leakage and breakdown voltages in wet cells.

These results were obtained:
  (a) capacitance: 10 (vol.%) $H_3PO_4$/22° C. bath, 120 cycles, 0.5 test voltage, GenRad 1658 RLC bridge ("Digibridge") instrument;
  (b) D.C. leakage: 10 (vol.%) $H_3PO_4$/22° C. bath, 49 V D.C., value at five minutes;
  (c) breakdown: 0.1 (vol.%) $H_3PO_4$/60° C. bath, 60 ma/gm, average of five pellets' breakdowns.

TABLE I

| Sinter T/Sample | | Temp of Presinter | P level | Si | CV/gm | DCL | VBD |
|---|---|---|---|---|---|---|---|
| 1,500° C. | 1 | 1,375° C. | 20 | 500 | 22,100 | .193 | 134 |
| 1,500° C. | 2 | 1,375 | 40 | 500 | 23,100 | .273 | 133 |
| 1,500° C. | 3 | 1,375 | 40 | 0 | 25,200 | .599 | 130 |
| 1,500° C. | 4 | 1,300 | 40 | 500 | 23,900 | .318 | 132 |
| 1,500° C. | 5 | 1,375 | 40 | 500 | 24,700 | .376 | 136 |
| 1,500° C. | 6 | 1,375 | 20 | 0 | 22,900 | .442 | 134 |
| 1,500° C. | 7 | 1,300 | 20 | 0 | 26,800 | .722 | 123 |
| 1,500° C. | 8 | 1,300 | 40 | 0 | 26,800 | .732 | 135 |
| 1,500° C. | 9 | 1,300 | 40 | 0 | 25,700 | .667 | 134 |
| 1,500° C. | 10 | 1,300 | 20 | 500 | 27,800 | .640 | 125 |
| 1,500° C. | 11 | 1,300 | 20 | 500 | 26,400 | .796 | 124 |
| 1,500° C. | 12 | 1,375 | 20 | 0 | 24,200 | .416 | 137 |
| 1,600° C. | 13 | 1,375 | 20 | 500 | 13,300 | .169 | 181 |
| 1,600° C. | 14 | 1,375 | 40 | 500 | 13,800 | .211 | 185 |
| 1,600° C. | 15 | 1,375 | 40 | 0 | 14,900 | 1.69 | 172 |
| 1,600° C. | 16 | 1,300 | 40 | 500 | 13,700 | .231 | 191 |
| 1,600° C. | 17 | 1,375 | 20 | 500 | 14,700 | .262 | 183 |
| 1,600° C. | 18 | 1,375 | 20 | 0 | 12,700 | .147 | 178 |
| 1,600° C. | 19 | 1,300 | 20 | 0 | 15,100 | .211 | 176 |
| 1,600° C. | 20 | 1,300 | 40 | 0 | 15,100 | 2.17 | 181 |
| 1,600° C. | 21 | 1,300 | 40 | 0 | 13,900 | 2.60 | 188 |
| 1,600° C. | 22 | 1,300 | 20 | 500 | 16,000 | .191 | 160 |
| 1,600° C. | 23 | 1,300 | 20 | 500 | 15,200 | .144 | 168 |
| 1,600° C. | 24 | 1,375 | 20 | 0 | 14,400 | .125 | 185 |

The capacitance and leakage units are microfarad volts per gram and nanoamperes per microfarad volt. Each expression of capacitance and leakage is an average of results for four pellets.

EXAMPLE II

Similar experimental processing, compared to Example I, above, with varied parameters were conducted to evaluate leakage effects further for tantalum powders with and without (500 ppm) silicon in tantalum powders sintered at 1,600° C.:

TABLE II

| | Leakage | | | |
|---|---|---|---|---|
| | 500* ppm Si/Sample | | 0 Si**/Sample | |
| 20 ppm P | .144 | 25 | .125 | 31 |
| | .191 | 26 | .261 | 32 |
| | .169 | 27 | .147 | 33 |
| 40 ppm P | .262 | 28 | .260 | 34 |
| | .231 | 29 | .217 | 35 |
| | .211 | 30 | .169 | 36 |

**except for incidental impurities, usually 10-30 ppm; i.e., no silicon
*500 added, at least half of which is retained in the secondary (agglomerated and deoxidized) powder

EXAMPLE III

The Example II work on 40 ppm P samples was extended with modifications of silicon addition schedule with the results shown in Table III.

TABLE III

| Sinter T/Sample | | Si | DCL |
|---|---|---|---|
| 1,500° C. | 37 | 500 | .187 |
| 1,600° C. | 38 | 500 | .226 |
| 1,500° C. | 39 | 500 | .414 |
| 1,600° C. | 40 | 500 | .469 |
| 1,500° C. | 41 | 500 [*] | .337 |
| 1,000° C. | 42 | 500 [*] | .590 |
| 1,500° C. | 43 | 500 | .266 |
| 1,500° C. | 44 | 500 | .321 |
| 1,500° C. | 45 | 500 [*] | .266 |
| 1,600° C. | 46 | 500 [*] | .501 |
| 1,500° C. | 47 | 250 | .359 |
| 1,000° C. | 48 | 250 | .716 |
| 1,500° C. | 49 | 250 | .313 |
| 1,600° C. | 50 | 250 | .689 |
| 1,500° C. | 51 | 125 | .283 |
| 1,600° C. | 52 | 125 | .476 |
| 1,500° C. | 53 | 125 | 2.91 |
| 1,600° C. | 54 | 125 | 8.71 |
| 1,500° C. | 55 | 0 | 4.89 |
| 1,600° C. | 56 | 0 | 20.92 |

EXAMPLE IV

Figure 2:
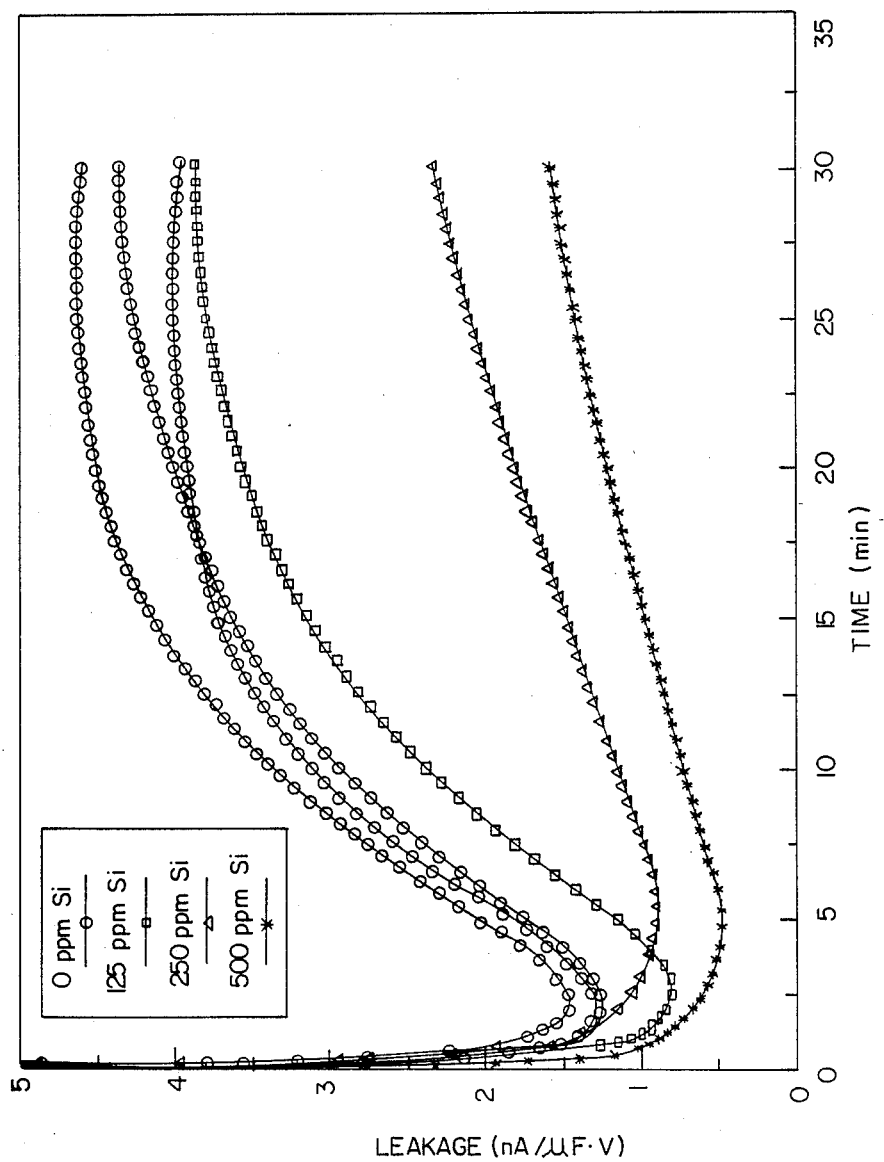

The work of the foregoing examples was extended at 60 ppm P and Si additions of 0, 125, 250 and 500 ppm to produce the leakage data shown in FIGS. 1 and 2.

EXAMPLE V

The capacitance-related effects were established for two series of reduction produced tantalum powders in various concentrations of Si and P, formed in a first series (A) at 60° C. and in a second series (B) at 80° C., capacitance being expressed in specific capacitance units of microfarad-volts per gram.

| A. 60° C. Formations | | | | | |
|---|---|---|---|---|---|
| | | Capacitance | | | |
| Sample # | Si Conc. PPM | 0 ppm P | | 20 ppm P | |
| | | 1,500 | 1,600 | 1,500 | 1,600 |
| 57 | 500 | 24,800 | 12,500 | 26,500 | 1,600 |
| 58 | 500 | 22,100 | 11,800 | 25,600 | 15,800 |
| 59 | 500 | 21,700 | 11,500 | 25,800 | 15,500 |
| 60 | 500 | 23,500 | 11,800 | 25,200 | 14,500 |
| 61 | 500 | 22,700 | 11,600 | 23,600 | 14,200 |
| 62 | 250 | 21,600 | 11,000 | 26,000 | 14,900 |
| 63 | 125 | 20,500 | 11,300 | 24,600 | 14,400 |
| 64 | 0 | 15,900 | 9,720 | 22,200 | 12,900 |

| B. 80° C. Formations | | | | | |
|---|---|---|---|---|---|
| | | Capacitance | | | |
| Sample # | Si Conc. PPM | 0 ppm P | | 40 ppm P | |
| | | 1,500 | 1,600 | 1,500 | 1,600 |
| 65 | 500 | 19,800 | 10,400 | 21,700 | 13,400 |
| 66 | 500 | 19,300 | 10,500 | 21,400 | 14,000 |
| 67 | 500 | 18,400 | 10,100 | 20,700 | 13,600 |
| 68 | 500 | 10,700 | 9,450 | 21,700 | 13,800 |

-continued

| | | B. 80° C. Formations | | | |
|---|---|---|---|---|---|
| | | Capacitance | | | |
| Sample # | Si Conc. PPM | 0 ppm P | | 40 ppm P | |
| | | 1,500 | 1,600 | 1,500 | 1,600 |
| 69 | 500 | 17,800 | 10,100 | 20,400 | 13,300 |
| 70 | 250 | 18,300 | 9,720 | 22,900 | 14,300 |
| 71 | 125 | 17,500 | 9,780 | 22,100 | 13,800 |

The import of the data of the foregoing Examples, and other aspects of the invention, includes at least the following:

(1) The dilemma of known benefit of high P content (e.g., 50 ppm) on capacitance and known drawback of high P content to leakage is resolved. Increasing Si content allows usuage of higher P contents with high capacitance and low leakage.

(2) Silicon doping alone can provide enhanced capacitance of the tantalum powder. Capacitance of the P/Si doped tantalum powders is enhanced compared to P doping per se. P doping or equivalent is referred to herein as "primary" capacitance enhancing dopant, the word "primary" being arbitrary and not a measure of relative volume inclusion or relative benefit.

(3) The limited window of opportunity of the state of the prior art of P dopant alone (high temperature (80° C.+) anodization enabling high P content/high capacitance-with-acceptable-leakage) is expanded to allow anodization at lower, as well as high, temperatures on the order of 40°-90° C., as a workable range.

(4) The silicon itself functions as a powerful sinter retardant and it is stably maintained (non-volatile) at the preferred industrial conditions of 1,400° C.-1,600° C. sinter temperatures. Surface area and intrinsic capacitance are maintained more effectively. This is related to point (2) above. In turn, this enables a reduction of P content, with the P/Si combined dopant system providing a more effective control tantalum powder properties.

The leakage reducing silicon dopant can be combined effectively with capacitance enhancing dopants other than phosphorous. However, it is believed that optimum results are realized in the silicon/phosphorous combination. The invention can also be applied to other valve metal powders of capacitor grade including niobium, titanium, zirconium and alloys thereof with each other and/or tantalum.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Improved capacitor grade tantalum powder which can be anodically formed to a low leakage product at formation temperatures selected substantially throughout the range 40°-90° C., comprising a content of silicon and phosphorous in combined concentration effecting a specific D.C. leakage (L/CV) of such powder of less than 0.5 nanoamperes per microfarad-volt and high specific capacitance (CV/g) in excess of 15,000 cv/gm in anodized pellets as made therefrom and sintered at 1,400° C. or higher.

2. Tantalum powder in accordance with claim 1 wherein the silicon content is 50-1,000 ppm relative to tantalum and the phosphorous content is 10-300 ppm relative to tantalum.

3. The tantalum powder of claim 1 as formed into an agglomerated powder.

4. Tantalum powder in accordance with claim 2 wherein the silicon content is 100-500 ppm and the phosphorous content is 20-80 ppm relative to tantalum.

5. An anodic pellet made of a sintered mass of the agglomerated powder of claim 3.

6. The pellet of claim 5 as anodically formed at a temperature in the range 40°-60° C.

7. The pellet of claim 6 as formed in a dilute mineral acid.

* * * * *